(12) United States Patent
Pavetic et al.

(10) Patent No.: US 10,614,539 B2
(45) Date of Patent: *Apr. 7, 2020

(54) DETECTING MULTIPLE PARTS OF A SCREEN TO FINGERPRINT TO DETECT ABUSIVE UPLOADING VIDEOS

(71) Applicant: GOOGLE LLC, Mountain View, CA (US)

(72) Inventors: Filip Pavetic, Zurich (CH); Matthias Rochus Konrad, Altendorf (CH); Hanna Pasula, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 179 days.

This patent is subject to a terminal disclaimer.

(21) Appl. No.: 15/949,424

(22) Filed: Apr. 10, 2018

(65) Prior Publication Data
US 2018/0232845 A1    Aug. 16, 2018

Related U.S. Application Data

(63) Continuation of application No. 15/260,252, filed on Sep. 8, 2016, now Pat. No. 9,972,060.

(51) Int. Cl.
*G06F 21/10* (2013.01)
*G06K 9/00* (2006.01)
(Continued)

(52) U.S. Cl.
CPC .......... *G06T 1/0021* (2013.01); *G06F 21/10* (2013.01); *G06K 9/00744* (2013.01);
(Continued)

(58) Field of Classification Search
None
See application file for complete search history.

(56) References Cited

U.S. PATENT DOCUMENTS

| 8,457,346 B2* | 6/2013 | Rodriguez | G01S 19/14 382/100 |
| 2008/0112630 A1* | 5/2008 | Nestares | H04N 5/144 382/236 |

(Continued)

OTHER PUBLICATIONS

International Search Report and Written Opinion in PCT/US2017/050404, dated Nov. 20, 2017.

*Primary Examiner* — Soo Shin
(74) *Attorney, Agent, or Firm* — Young Basile Hanlon & MacFarlane, P.C.

(57) ABSTRACT

Fingerprinting a video including video frames is disclosed. A method includes receiving the video, generating sub-images, generating sub-fingerprints for the video using the sub-images, and matching the video to a reference video using the sub-fingerprints. Generating sub-images includes, for a video frame of some of the video frames, generating a binary image for the video frame, identifying a first region of the binary image, and identifying a sub-image of the video frame that is co-extensive and co-located with the first region of the binary image. A pixel of the video frame is identified in the binary image by a first value or a second value where the first value indicates a motion pixel and the second value indicates a still pixel. The first region includes more of the first value than the second value, and the first region is indicative of a motion in the video frame.

20 Claims, 6 Drawing Sheets

(51) Int. Cl.
*G06K 9/46* (2006.01)
*G06K 9/62* (2006.01)
*G06T 1/00* (2006.01)
*G06T 7/11* (2017.01)
*G06T 7/20* (2017.01)
*G06T 7/90* (2017.01)
*H04N 21/234* (2011.01)
*H04N 21/254* (2011.01)
*H04N 21/2743* (2011.01)
*H04N 21/8352* (2011.01)

(52) U.S. Cl.
CPC ......... *G06K 9/4604* (2013.01); *G06K 9/6202* (2013.01); *G06T 7/11* (2017.01); *G06T 7/20* (2013.01); *G06T 7/90* (2017.01); *H04N 21/23418* (2013.01); *H04N 21/2541* (2013.01); *H04N 21/2743* (2013.01); *H04N 21/8352* (2013.01); *G06T 2207/10016* (2013.01); *G06T 2207/10024* (2013.01)

(56) References Cited

U.S. PATENT DOCUMENTS

| | | | |
|---|---|---|---|
| 2009/0263014 A1* | 10/2009 | Zhang | G06K 9/00711 382/165 |
| 2009/0324199 A1* | 12/2009 | Haitsma | G06K 9/00744 386/241 |
| 2009/0327334 A1 | 12/2009 | Rodriguez et al. | |
| 2010/0061590 A1* | 3/2010 | Neogi | G06K 9/00711 382/100 |
| 2010/0211794 A1* | 8/2010 | Bilobrov | G06K 9/00067 713/176 |
| 2016/0267079 A1* | 9/2016 | Ramanathan | G06F 16/9014 |

\* cited by examiner

DETECTING MULTIPLE PARTS OF A SCREEN TO FINGERPRINT TO DETECT ABUSIVE UPLOADING VIDEOS

CROSS-REFERENCE TO RELATED APPLICATION(S)

This application is a continuation of U.S. application patent Ser. No. 15/260,252, filed Sep. 8, 2016, the entire disclosure of which is hereby incorporated by reference

BACKGROUND

1. Field of Art

The invention generally relates to video processing, and more specifically to video fingerprinting.

2. Description of the Related Art

Online systems store, index, and make available for consumption various forms of media content to Internet users. This content may take a variety of forms; in particular, video content, including streaming video is widely available across the Internet. Online video systems allow users to view videos uploaded by other users. Popular online content systems for videos include YouTube™. These online video systems may contain thousands or millions of video files, making management of these video files an extremely challenging task. One challenge is that users upload unauthorized copies of copyrighted video content since online video systems allow users to freely upload video content. As such, online video systems need a mechanism for identifying and removing these unauthorized copies.

While some files may be identified by file name or other information provided by the user, this identification information may be incorrect or insufficient to correctly identify the video. An alternate approach of using humans to manually identifying video content is expensive and time consuming. Various methods have been used to automatically detect similarities between video files based on their video content. In the past, various identification techniques (such as an MD5 hash on the video file) have been used to identify exact copies of video files. Generally, a digital "fingerprint" is generated by applying a hash-based fingerprint function to a bit sequence of the video file; this generates a fixed-length monolithic bit pattern—the fingerprint—that uniquely identifies the file based on the input bit sequence. Then, fingerprints for files are compared in order to detect exact bit-for-bit matches between files. Alternatively, instead of computing a fingerprint for the whole video file, a fingerprint can be computed for only the first frame of video, or for a subset of video frames.

However, these methods often fail to identify unauthorized videos that include other content that is specifically added to disguise unauthorized content. For example, users place video frames of an unauthorized video in cinema or monochrome surroundings to give an impression that it is a different video to avoid being detected. Accordingly, an improved technique is needed for finding similarities between videos and detecting unauthorized content based on the perceived visual content of the video.

SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

In one embodiment, a method of fingerprinting a video including video frames is disclosed. The method includes receiving the video, generating sub-images, generating sub-fingerprints for the video using the sub-images, and matching the video to a reference video using the sub-fingerprints. Generating sub-images includes, for a video frame of each of at least some of the video frames, generating a binary image for the video frame, identifying a first region of the binary image, and identifying a sub-image of the video frame that is co-extensive and co-located with the first region of the binary image. A pixel of the video frame is identified in the binary image by a first value or a second value where the first value indicates a motion pixel and the second value indicates a still pixel. The first region includes more of the first value than the second value, and the first region is indicative of a motion in the video frame. The sub-image includes image content.

In one embodiment, a system for fingerprinting a video including video frames is disclosed. The system includes a memory and a processor. The processor is configured to execute instructions stored in the memory to receive the video, generate sub-images, generate sub-fingerprints for the video using the sub-images, and match the video to a reference video using the sub-fingerprints. Generating sub-images includes, for a video frame of each of at least some of the video frames, generating a binary image for the video frame, identifying a first region of the binary image, and identifying a sub-image of the video frame that is co-extensive and co-located with the first region of the binary image. A pixel of the video frame is identified in the binary image by a first value or a second value where the first value indicates a motion pixel and the second value indicates a still pixel. The first region includes more of the first value than the second value, and the first region is indicative of a motion in the video frame. The sub-image includes image content.

In one embodiment, a non-transitory computer-readable storage medium, including executable instructions that, when executed by a processor, facilitate performance of operations of fingerprinting a video including video frames. The operations include receiving the video, generating sub-images, generating sub-fingerprints for the video using the sub-images, and matching the video to a reference video using the sub-fingerprints. Generating sub-images includes, for a video frame of each of at least some of the video frames, generating a binary image for the video frame, identifying a first region of the binary image, and identifying a sub-image of the video frame that is co-extensive and co-located with the first region of the binary image. A pixel of the video frame is identified in the binary image by a first value or a second value where the first value indicates a motion pixel and the second value indicates a still pixel. The first region includes more of the first value than the second value, and the first region is indicative of a motion in the video frame. The sub-image includes image content.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
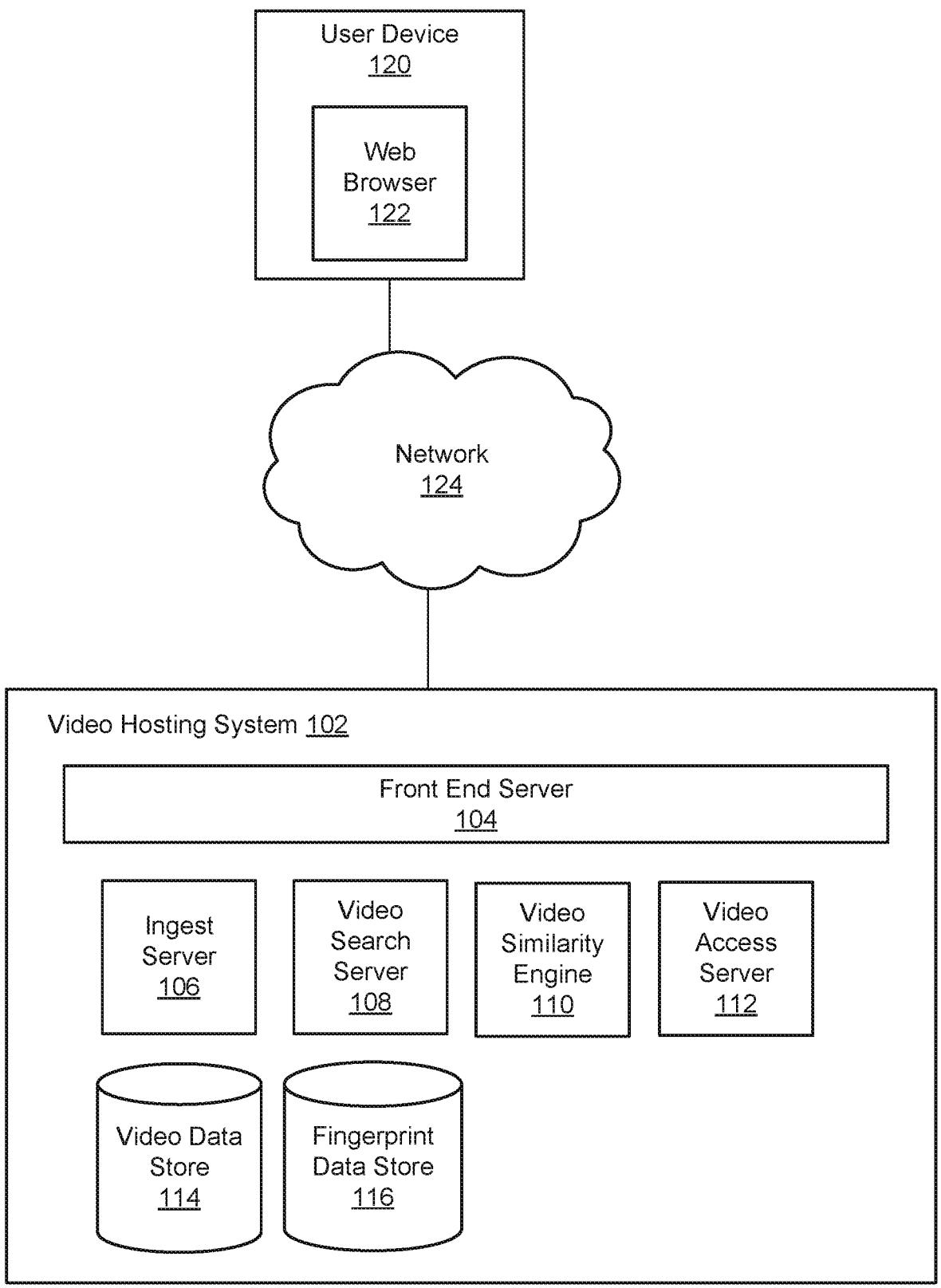
FIG. 1 is a high level block diagram of a system for detecting unauthorized video content, according to one embodiment.

FIG. 1 is a high-level block diagram of a system for detecting unauthorized video content, according to one embodiment. FIG. 1 illustrates a video hosting system 102 and a user device 120 connected by a network 124. A client can use the user device 120 to access videos contained within the video hosting system 102. A client can access a video from the video hosting system 102 by browsing a catalog of videos, conducting searches using keywords, reviewing play lists from other clients or the system administrator (e.g., collections of videos forming channels), or viewing videos associated with particular client groups (e.g., communities). Additionally, in some embodiments, the video hosting system 102 is adapted to receive videos for storage in order to enable the sharing of the videos with other clients.

The user device 120 communicates with the video hosting system 102 over the network 124. In one embodiment, the user device 120 is a personal computer executing a web browser 122 such as GOOGLE CHROME that allows a client to view web pages and videos provided by the video hosting system 102. In another embodiment, the user device 120 is a mobile device such as a smartphone or tablet computer, or even a personal computer, that executes a software application ("app") providing specific functionality for accessing the video hosting system 102. The user device 120 may also be another network-capable device such as a car entertainment system, television "set-top box," etc. Although FIG. 1 illustrates only a single user device 120, it should be understood that many user devices (e.g., millions) can communicate with the video hosting system 102 at any time. Only one user device 120 is illustrated in order to simplify and clarify the present description.

The network 124 represents the communication pathways between the user device 120 and the video hosting system 102. In one embodiment, the network 124 is the Internet, but may also be any network, including but not limited to wired or wireless networks, cloud computing networks, private networks, virtual private networks, and any combination thereof. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The video hosting system 102 allows clients to access video content via searching and/or browsing interfaces. The sources of videos can be from client uploads of videos, searches or crawls of other websites or databases of videos, or the like, or any combination thereof. For example, in one embodiment a video hosting system 102 can be configured to allow for client uploads of content; in another embodiment a video hosting system 102 can be configured to only obtain videos from other sources by crawling such sources or searching such sources in real time.

A suitable video hosting system 102 for implementation of the system is the YOUTUBE™ website. It will be understood that the term "website" represents any computer system adapted to serve content using any internetworking protocols, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

The video hosting system 102 comprises a front end server 104, an ingest server 106, a video search server 108, a video similarity engine 110, a video access server 112, a video data store 114, and a fingerprint data store 116. Many conventional features, such as firewalls, load balancers, application servers, failover servers, site management tools and so forth are not shown so as not to obscure the features of the system.

The front end server 104 handles all communication with the user device 120 via the network 124. The front end server 104 receives requests from the user device 120 and communicates with the other servers of the video hosting system 102 in order to process the requests. The front end server 104 is further configured to monitor client interactions with the video hosting system 102. For example, if a client clicks on a web page, uploads a video, views a video, makes a purchase, or fills a web-based form, the front end server 104 monitors these interactions. The front end server 104 may be further configured to transmit and present the requested video and related video links to the user device 120 on a webpage. The requested video is streamed by the front end server 104 to the user device 120. One or more related video links appear on the webpage where the requested video is playing, such that the related video link can be selected by a client in order to view the related videos.

Any content received via the network 124 from a user device 120 for posting to the video hosting system 102 is passed on to the ingest server 106 for processing. The processing of the video file includes assigning an identifier to the newly received video file. Other steps of processing the video file may include formatting (e.g., transcoding), compressing, metadata tagging, content analysis, and/or other data processing methods. In one embodiment, the user device 120 transmits a form along with the video file transmitted to the video hosting system 102. The client may include in the form information that describes the video (e.g., title, description, and tag information). The form information may also include an indication of the media type, which for uploaded videos would always be the "video" type. The ingest server 106 stores the processed video file in a video data store 114 and stores the information included in the form as metadata of the video file. The video data store 114 is the storage system where the video files transmitted to the video hosting system 102 are stored. A video may be accompanied by icons or thumbnail views, associated metadata, such as title, author, tags, description, comments, and rating. In various embodiments, the ingest server 106 may pass received videos directly to the video similarity engine 110 for analysis.

The video search server 108 processes clients' requests received by the front end server 104 and identifies videos that are relevant to the clients' requests. A client request provided by a client via the user device 120 to the front end server 104 may include a search query specifying one or more search terms. The video search server 108 may use the search term, for example, to query the metadata of all video files stored in the video data store 114. The search results are the videos of which the associated metadata is relevant to the search term. The search results from the query are transmitted to the front end server 104, so that the search results can be presented to the client.

The video access server 112 receives from the front end server 104 requests from clients that wish to view a specific video. From the client perspective, a client may submit a request for a video by browsing the different categories of the video hosting system 102 or by clicking on a link to a video from a search results webpage. The request transmitted by the user device 120 can include the identifier of the video the client wishes to view (which can be included automatically once the client clicks on the link for the video). The video access server 112 uses the identifier to search and locate where the video is stored in the video data store 114. The video access server 112 provides the video requested to the front end server 104.

The video similarity engine 110 determines if an uploaded video includes video content of one or more other videos, for example, from videos that are copyright protected, access restricted, or are otherwise noteworthy. If the uploaded video is similar to an existing video, the video similarity engine 110 may flag or remove the video from the video hosting system 102, depending upon whatever logic is added to the video similarity engine 110 to process such unauthorized videos. The video similarity engine 110 can process a video simultaneously while it is being uploaded. The video similarity engine 110 can also process a video simultaneously when the ingest server 106 is processing the video.

To determine similarity, the video similarity engine 110 may create one or more fingerprints and one or more sub-fingerprints of a video. Sub-fingerprints are generated using video content that includes motion. Sub-fingerprints therefore represent a portion of the video content included in a video and can be used to identify whether a given video includes within its frames video content that is wholly or partially copied from another video. The video similarity engine 110 compares sub-fingerprints to fingerprints stored in a fingerprint data store 116. Upon determining a sub-fingerprint of a video matching a fingerprint stored in the fingerprint data store 116 that is derived from another video, the video similarity engine 110 determines that the video includes video content copied from another video. If video is already uploaded to the system, the video may be removed from the video hosting system 102 (e.g., the video data store 114). If the video is still being uploaded, the upload of the video may be terminated.

The fingerprint data store 116 stores fingerprints derived from a video corresponding to a video file stored in the video data store 114. Fingerprints stored in the fingerprint data store 116 can be used as reference for the video similarity engine 110 to determine whether a video includes video content of one or more other videos.

It should be appreciated that the data processing operations of the video similarity engine 110, as described herein, inherently require a programmed computer system for their practical implementation. To simplify and clarify the present description, the content received and shared by the video hosting system 102 is generally referred to as videos, video files, or video items, as appropriate for the video-specific embodiments described herein, but it should be understood that the video hosting system 102 can receive and share content of any media type that includes pictures of moving content such as 360 degree videos, 3D videos, etc., virtual or augmented reality content, etc.

Video Similarity Engine

Figure 2:
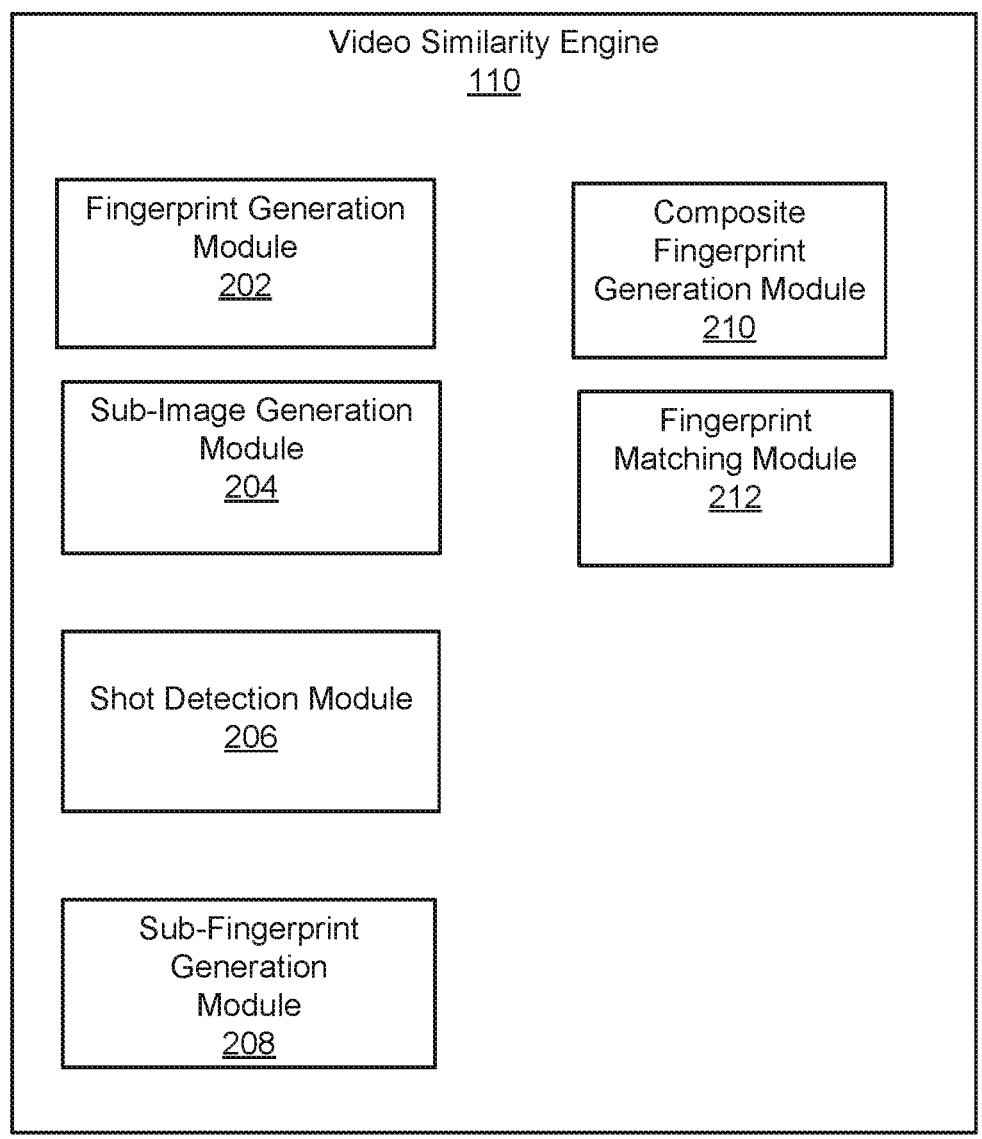
FIG. 2 is a high-level block diagram illustrating a detailed view of the video similarity engine, according to one embodiment.

FIG. 2 is a high-level block diagram illustrating a detailed view of the video similarity engine 110, according to one embodiment. As shown in FIG. 2, the video similarity engine 110 includes several modules. Those of skill in the art will recognize that other embodiments can have different modules than the ones described here, and that the functionalities can be distributed among the modules in a different manner. In addition, the functions ascribed to the video similarity engine 110 can be performed by multiple engines. As illustrated, the video similarity engine 110 includes a fingerprint generation module 202, a sub-image generation module 204, a shot detection module 206, a sub-fingerprint generation module 208, a composite fingerprint generation module 210, and a fingerprint matching module 212.

Fingerprint Generation Module

The fingerprint generation module 202 generates fingerprints for a video. The fingerprint generation module 202 generates fingerprints for time intervals of a video using video frames of the video. A fingerprint can be generated based on a video frame or an uninterrupted sequence of video frames that have continuity in image content. As an example, a fingerprint may be represented a bit vector representing, for example, the spatial, temporal, and/or structural characteristics of a video frame. The fingerprint identifies a video frame based on its visual content such that minor variations due to compression, de-compression, noise, frame rate, start and stop time, source resolutions and the like do not significantly affect the fingerprint. The fingerprint generation module 202 may receive a video from the front end server 104, from the ingest server 106, or from the video data store 114. In some embodiments, the fingerprint generation module 202 generates fingerprints for a video simultaneously when the ingest server 106 processes the video.

Sub-image Generation Module

The sub-image generation module 204 generates sub-images using video frames of a video. A sub-image of a video frame includes image content of the video frame that includes motion. Video content that includes motion which is embedded within a static or semi-static frame or image is assumed to be more likely to include unauthorized content relative to a more standard video. As used herein, video content refers to visual content of a video and image content refers to the visual content of a single video frame of the video. The sub-image generation module 204 identifies video content that includes motion and corresponding regions of individual video frames.

The sub-image generation module 204 extracts the image content (e.g., pixels and associated color values) of the identified regions from individual video frames to create sub-images. When a video includes unauthorized video content of another video as well as additional "disguising" content (such as a frame or static image), sub-images of the video are generated to include the unauthorized video content excluding the disguising content. Sub-images of a video are used to generate sub-fingerprints that are used to detect whether the video includes unauthorized content of another video.

As an example, a video may include video content from another video and a background static image that stays substantially or entirely the same between frames. For each of a sequence of video frames, the sub-image generation module 204 may generate a sub-image corresponding to each video frame, where the sub-image includes the region of each frame where the other video's content is depicted. As another example, a video may include video content from two different videos. The sub-image generation module 204 may generate separate sub-images corresponding to a video frame of a first video and to a video frame of a second video.

To identify content for inclusion in sub-images, the sub-image generation module 204 tracks motion of video content through time (i.e., across multiple frames). The sub-image generation module 204 performs a motion analysis to estimate the relative motion of pixels between video frames. Specifically, the motion analysis may involve comparing the color values of pixels of a first video frame to the color values of the corresponding pixels of the subsequent video frame. If the color values of the pixel between the two frames change at least a threshold amount, the sub-image generation module 204 labels the pixel as a motion pixel. The sub-image generation module 204 labels those pixels of which the color values change less than the threshold amount as still pixels. The sub-image generation module 204 can apply a fixed time window to consecutive frames to identify pixels of which the pixel values have changed.

Having labeled the pixels as motion pixels or still pixels, the sub-image generation module 204 generates a binary image for each video frame, where the pixels of the binary image have a value of 1 for motion pixels and 0 for the still pixels. For videos where another video has been superimposed onto a static or semi-static image, the resulting binary image will often be a substantially filled rectangular area of 1's surrounded by 0's. The sub-image generation module 204 uses the area of mostly 1's to identify the regions that will be extracted as sub-images. The sub-image generation module 204 may form a region by fitting a rectangle around the identified motion pixels such that the rectangle encompasses the identified motion pixels and in some cases a least some number of still pixels as well. In one embodiment, a rotating calipers algorithm may be used to determine minimum area rectangle for a sub-image region that maximizes or increases the number or percentage of 1's in the rectangle and/or minimizes or reduces the number of 0's in the region.

Some areas that include motion pixels are not identified as regions that will be extracted as sub-images. Areas of which still pixels are more than motion pixels are likely to be background such as static or semi-static image and thus are not identified as regions that will be extracted as sub-images. For a particular area, the sub-image generation module 204 may determine a ratio of still pixels to motion pixels and compare the determined ratio to a threshold ratio to determine whether or not the area should be identified as a region that will be extracted as a sub-image. When the determined ratio is at least the threshold ratio, the sub-image generation module 204 identifies the particular area as a region that will be extracted as a sub-image. Otherwise, the area will be disregarded. In addition, areas that are too small are not likely to include sufficient pixel information for determining whether a frame includes unauthorized content and thus are not identified as regions that will be extracted as sub-images. For a particular area, the sub-image generation module 204 may compare its size to a threshold size to determine whether or not the area should be identified as a region that will be extracted as a sub-image. When the determined size is at least the threshold size, the sub-image generation module 204 identifies the particular area as a region that will be extracted as a sub-image. Otherwise, the area will be disregarded.

The sub-image generation module 204 extracts the pixels included in the region and the associated pixel values to create a sub-image of the video frame. This process may be repeated for a single video frame, such that multiple sub-images are created from a single video frame. Sub-images retain the temporal characteristics of the corresponding video frames from which they are generated. That is, a sub-image is associated with a start/end time or timestamp of its corresponding video frame.

The sub-image generation module 204 assigns a sub-image ID to a generated sub-image and associates the sub-image ID with the sub-image. Sub-image IDs may be shared between multiple sequential sub-images generated from sequential video frames and that correspond to regions that are of substantially or completely the same location and size. The location and size of the region used to generate the sub-image can be determined, for example, based on the locations (e.g., X-Y positions illustrated in FIG. 3A as further described below) of the pixels that are on the boundary of the region.

The sub-image generation module 204 is further configured to determine whether a given sub-image ID should be re-used between video frames. To do this, the sub-image generation module 204 compares a location and a size of a first region of a first video frame to a second location and a size of a second region of a second video frame. Responsive to determining that a difference in location and a difference in size between the first region of the first video frame and the second region of the second video frame are within both of a location difference threshold and a size difference threshold, the sub-image generation module 204 determines the first region of the first video frame and the second region of the second video frame have the same or substantially the same location and size. The given sub-image ID is re-used between these two consecutive video frames. This process may continue for subsequent frames until at least one of the difference in location and the difference in size is greater than the location difference threshold and/or the size difference threshold. The given sub-image ID is not re-used between these two consecutive video frames. A new sub-image ID is assigned to the second video frame.

The sub-image generation module 204 may generate sub-images of a video simultaneously when the ingest server 106 is processing the video. An example of generating sub-images is provided with reference to FIG. 3B as further described below.

Shot Detection Module

The shot detection module 206 organizes sequences of consecutive sub-images into shots to serve as a baseline upon which sub-fingerprints will be generated. The shot detection module 206 analyzes the characteristics of the consecutive sub-images to determine temporal locations of discontinuities in video content of the sub-images. A discontinuity can be, for example, an abrupt change such as when a video scene switches from one camera angle to another (i.e. a cut), a fade in which the shot slowly fades to black and a new shot begins, a dissolve in which a first shot slowly transitions into a second shot, or any other type of transition. Generally, discontinuities may be identified based on any sub-image feature that can be identified from the content of the sub-images in each consecutive pair. Discontinuities may also be identified based on a change in sub-image ID between sub-images. The shot detection module 206 divides the consecutive sub-images into a set of shots based on the presence of these continuities between pairs or sets of consecutive sub-images.

The shot detection module 206 may also break the underlying video itself, or the video frames without the extracted regions/sub-images, into shots in the manner described above.

The set of sub-image shots are provided to the sub-fingerprint generation module 208 for generation of sub-fingerprints. The generated sub-image shots are used to create a set of sub-fingerprints for different time intervals of a video. For example, sub-fingerprints may be generated for every time interval T (e.g., 1 second) of a video from the beginning (T=0) of the video. For a given time interval nT to (n+1)T (wherein n is an integer) of a video, the shot detection module 206 provides one or more shots that have a start time at or later than the time point nT and before the time point (n+1)T to generate sub-fingerprints. If no shot for the given time interval exists, empty sub-fingerprints for those time intervals may be created, and the shot detection module 206 may notify the sub-fingerprint generation module 208 accordingly.

In another implementation, the shot detection module 206 organizes the generated shots before providing them to the sub-fingerprint generation module 208. The shot detection module 206 may group the shots by the sub-image ID associated with the sub-images included in the shot. One or more shots that have the same sub-image ID are organized into one group. A sub-fingerprint can be generated using a group of shots that have the same sub-image ID. An example of shot detection is provided with reference to FIG. 3C as further described below.

Sub-fingerprint Generation Module

The sub-fingerprint generation module 208 generates sub-fingerprints for time intervals of a video using sub-images generated for the video. Sub-fingerprints are generated for every time interval T of a video from the beginning (T=O) of the video using one or more sub-images, shots of sub-images, or groups of shots for the time interval. In some embodiments, for a time interval of a video, a sub-fingerprint is generated using the one or more shots of the video, of which a starting time is at or later than a starting time point of the time interval as described above. When no such shot exists, an empty sub-fingerprint is generated for that time interval of the video. As a shot can last over multiple time intervals of a video, a sub-fingerprint generated using one shot for one time interval of a video can represent video content of subsequent time intervals of the video. Therefore, an empty sub-fingerprint is generated for video content of those time intervals of a video that has been represented. An example of generating sub-fingerprints is provided with reference to FIG. 3C as further described below.

Composite Fingerprint Generation Module

The composite fingerprint generation module 214 generates a composite fingerprint for every time interval T of a video from the beginning (T=O) of the video. For a time interval T of a video, a composite fingerprint is a data structure that includes or references one or more fingerprints generated for the time interval T of the video and one or more sub-fingerprints generated for the time interval T of the video. A composite fingerprint of a video, therefore, can represent the entire and also a portion of the "motion" video content for the time interval T of the video. The composite fingerprint generation module 214 receives fingerprints generated by the fingerprint generation module 202 and sub-fingerprints generated by the sub-fingerprint generation module 208. A sub-fingerprint may be an empty sub-fingerprint.

As fingerprints and sub-fingerprints each represent different aspects of the substantive content of a video, a composite fingerprint therefore also represents, in a compressed form, the substantive characteristics of video as a whole, from the fingerprint, as well as characteristics of the sub-images extracted from the video, from the sub-fingerprints. A composite fingerprint, therefore can be used to determine if a video includes video content from another video, particularly even if the video was designed to embed content, often unauthorized, from other videos in order to obscure that embedding.

Fingerprint Matching Module

The fingerprint matching module 216 receives a composite fingerprint and matches the received composite fingerprint against reference fingerprints from fingerprint data store 116 associated with reference videos. The fingerprint matching module 216 matches the fingerprints of the video and sub-fingerprints of sub-images of the video included in a composite fingerprint against the reference fingerprints. A matching result indicates that video under consideration includes video content from one of the reference videos. The fingerprint matching module 216 may perform the matching simultaneously when the ingest server 106 processes the video.

Figure 3A:
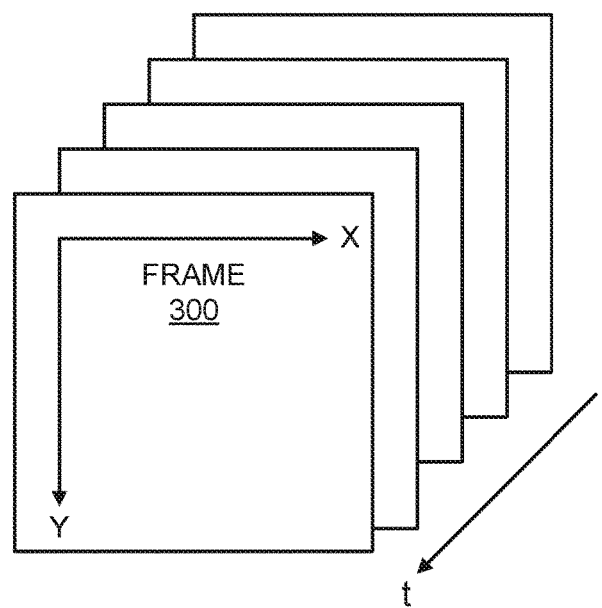
FIG. 3A illustrates an example structure for a video received by a video similarity engine, according to one embodiment.

An example structure for a video received by the video similarity engine 110 is provided in FIG. 3A. The video comprises a series of video frames 300. Each video frame 300 comprises an image having a plurality of pixels arranged in a two-dimensional grid (for example, in an X direction and a Y direction). The series of video frames 300 are also arranged sequentially in time (the t direction). Accordingly, a video comprises both spatial information, defined by the arrangement of pixels in the X and Y directions, and sequential or temporal information defined by how the pixels change throughout the time (t) dimension.

Figure 3B:
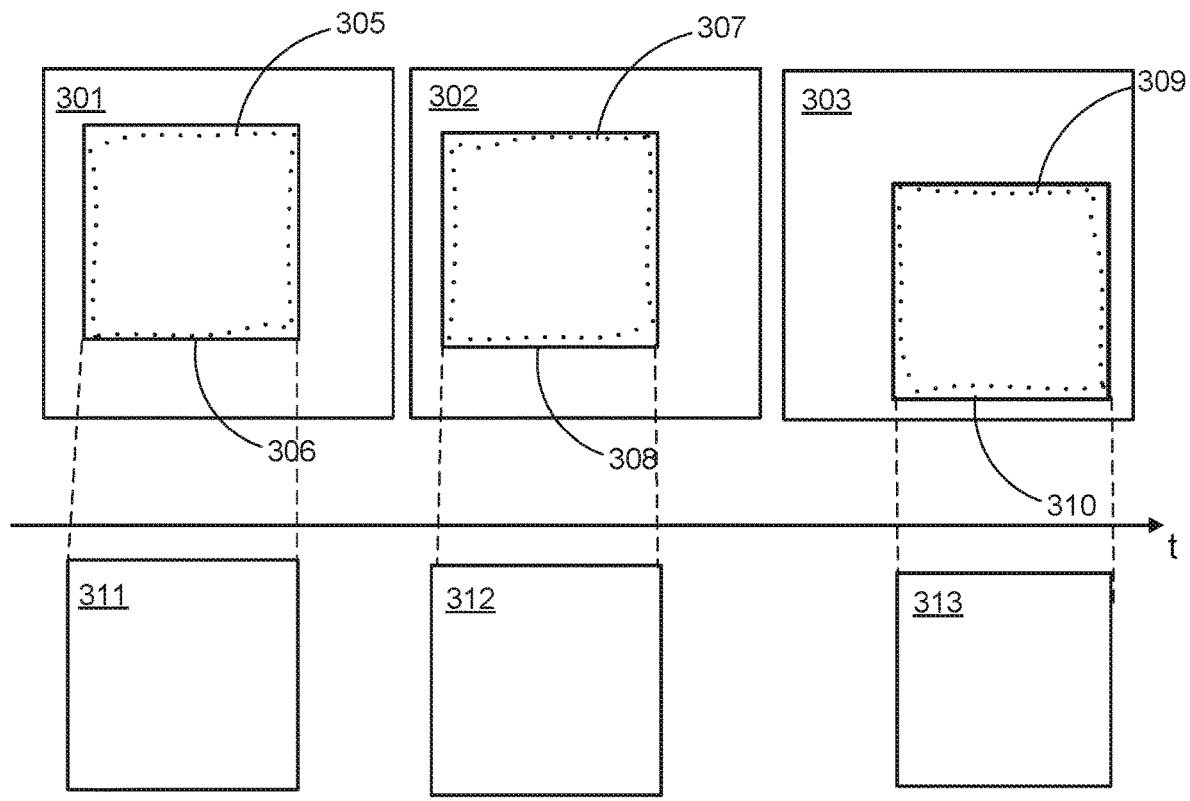
FIG. 3B illustrates examples of generating sub-images for video frames, according to one embodiment.

FIG. 3B illustrates examples of generating sub-images for video frames, according to one embodiment. Frames 301 through 303 are three consecutive video frames of a video. Pixels included in a region 305 (307 or 309) change their values over the video frames 301-302 (302-303 or 303 and the immediately next frame). A region, such as the regions 305-309, can be rectangular. The regions 305 (307 or 309) are identified. A rectangle 306 (308 or 310) is applied to encompass the region 305 (307 or 309) and to include a least some number of pixels of which the values stay the same over the video frames 301-302 (302-303 or 303 and the immediately next frame). Pixels included in the region 305 (307 or 309) are extracted to create a sub-image 311 (312 or 313) of the video frame 301 (302 or 303). Sub-images 311 through 313 retain the start and end time of their respective corresponding video frames 301 through 303. The sub-images 311 through 313 each are assigned with a sub-image ID. The sub-images 311 and 312 are assigned with a same sub-image ID because the corresponding rectangle regions 306 and 308 have the same or substantially the same locations and sizes.

Figure 3C:
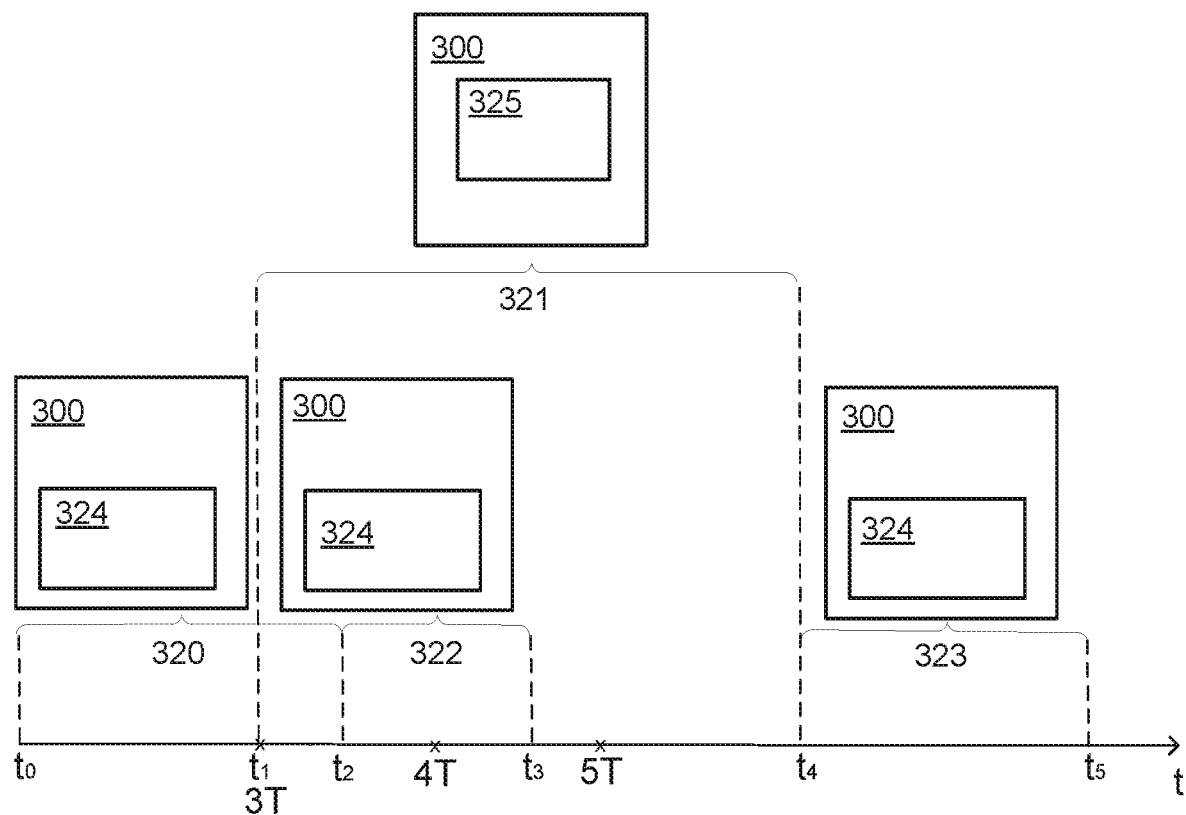
FIG. 3C illustrates examples of generating shots and sub-fingerprints for a video, according to one embodiment.

FIG. 3C illustrates examples of generating shots and sub-fingerprints for a video, according to one embodiment. Over time, multiple uninterrupted sequences of sub-images (i.e. shots) are created. A first and a third shots 320 and 322 are created for the time interval t0 to t2 and t2 to t3 of a video, respectively. The sub-images are created by extracting pixels of a region 324 from a corresponding video frame 300. A second shot 321 is created for the time interval t1 to t4 of a video. The sub-images are created by extracting pixels of a region 325 from a corresponding video frame 300. A fourth shot 323 is created for the time interval t4 to t5 of a video. The sub-images are created by extracting pixels of a region 324 from a corresponding video frame 300. Sub-images of the first and third shots 320 and 322 are associated with a same sub-image ID because the sub-images are created from a same region 321 of consecutive video frames. Sub-images of the first and third shots 320 and 322 are associated with a different sub-image ID than the sub-image ID with which sub-images of the fourth shot 323 are associated even though the sub-images are created from a same region 321 because the sub-images are created from discrete video frames. The shots 321 and 322 are used to create sub-fingerprints for a time interval 3T to 4T of the video. The shot 321 has a start time t1 that is at the time point 3T. The shot 322 has a start time t1 between time points 3T and 4T. An empty sub-fingerprint is created for a time interval 4T to 5T of the video because no shots have a start time at the time point 4T or between the time points 4T to 5T.

Process of Generating Sub-fingerprints of a Video

Figure 4:
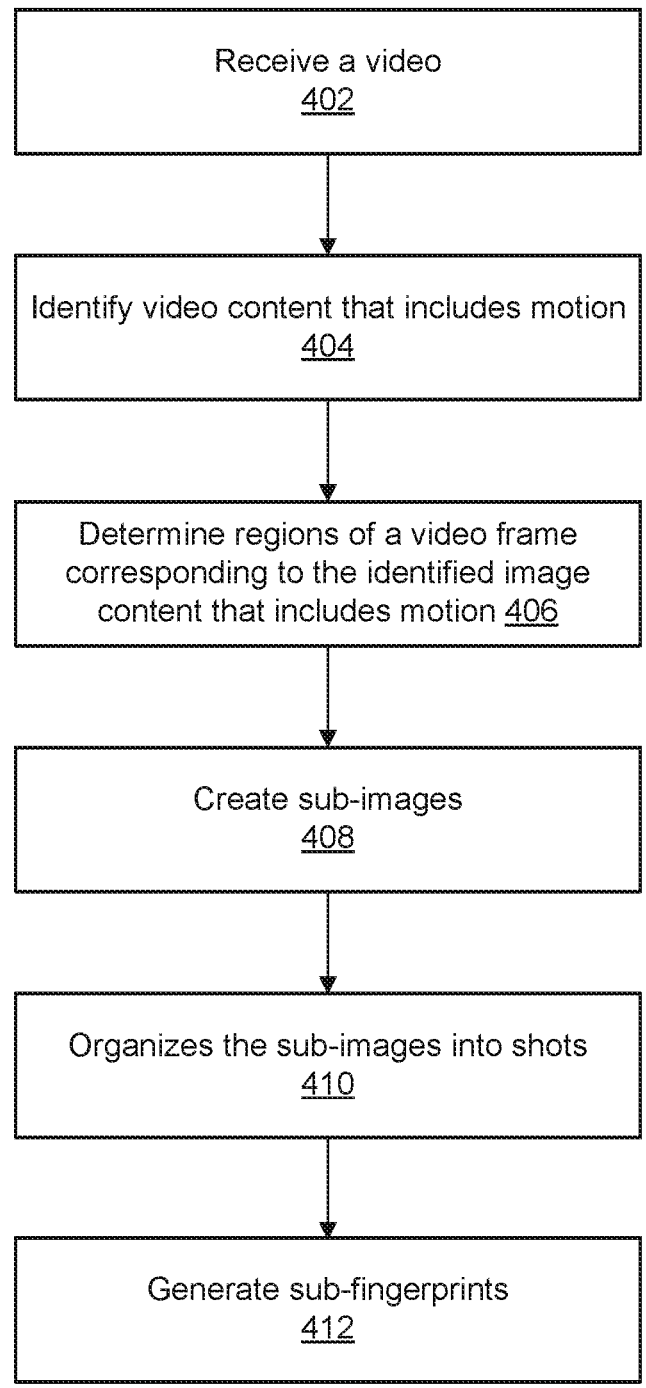
FIG. 4 illustrates a flow chart of an example process of generating sub-fingerprints of a video, according to one embodiment.

FIG. 4 illustrates a flow chart of an example process of generating sub-fingerprints of a video, according to one embodiment. The video hosting system 102 receives 402 a video. The video hosting system 102 identifies 404 video content of the video that includes motion. The video hosting system 102 tracks motion of the video content through time. The video hosting system 102 may detect motions of video content by comparing color values of pixels of one video frame to color values of corresponding pixels of another video frame subsequent to the first video frame. At any time point of a video, the video hosting system 102 identifies pixels of which the color values change between a pair of consecutive frames to determine motion of video content. A fixed time window can be applied to consecutive frames to identify pixels of which the pixel values have changed. Pixels of which the color values change at least a threshold amount are labeled as motion pixels and pixels of which the color values change less than the threshold amount are labeled as still pixels.

The video hosting system 102 determines 406 one or more regions of a video frame corresponding to image content that includes motion. Image content of the identified region of a video frame is likely to include unauthorized content and will be extracted to create sub-images. For a particular region of a video frame that is identified, a ratio of motion pixels to still pixels included therein is greater than a threshold ratio and a size of the region is greater than a threshold size. For a particular video frame, the video hosting system may form a region by fitting a rectangle around the identified motion pixels such that the rectangle encompasses the identified motion pixels and in some cases a least some number of still pixels.

The video hosting system 102 creates 408 sub-images for video frames of a video. For a particular video frame, a sub-image may be created by extracting the pixels included in an identified region and the associated color values. One or more sub-images may be generated for a video frame of the video. A sub-image is associated with a sub-image ID. Sub-image IDs may be shared between multiple sequential sub-images generated from sequential video frames and that correspond to regions that are of substantially or completely the same location and size.

The video hosting system 102 organizes 410 sequences of consecutive sub-images into shots as a baseline upon which sub-fingerprints will be generated. A shot is an uninterrupted sequence of sub-images includes sub-images that are associated with a same sub-image ID and that have continuity in video content. The video hosting system 102 analyzes the characteristics of the consecutive sub-images to determine temporal locations of discontinuities in video content of the sub-images. The video hosting system 102 divides the consecutive sub-images into a set of shots based on the presence of these continuities between pairs or sets of consecutive sub-images.

The video hosting system 102 generates 412 sub-fingerprints for time intervals of a video using sub-images generated for the video. A sub-fingerprint represents characteristics of the sub-images extracted from the video. For a given time interval nT to (n+1)T (wherein n is an integer) of the video, sub-fingerprints are generated using one or more shots that have a start time at or later than the time point nT and before the time point (n+1)T. If no shot for the given time interval of the video exists, an empty sub-fingerprint is generated for the time interval of the video.

Process of Detecting Whether a Video Includes Video Content of Other Videos

Figure 5:
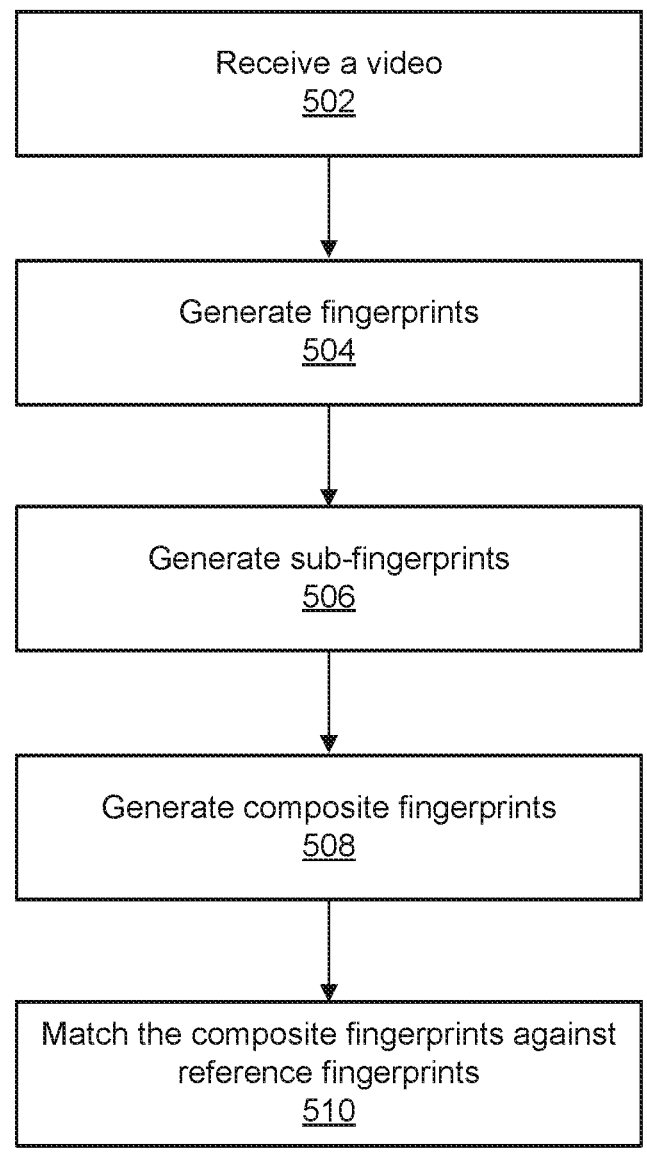
FIG. 5 illustrates a flow chart of an example process of detecting whether a video includes video content of other videos, according to one embodiment.

FIG. 5 illustrates a flow chart of an example process of detecting whether a video includes video content of other videos, according to one embodiment. The video hosting system 102 receives 502 a video. The video hosting system 102 generates 504 one or more fingerprints of the video. Fingerprints are generated for time intervals of a video using video frames of the video. Details of generating fingerprints are described with respect to FIG. 2. The video hosting system 102 generates 506 one or more sub-fingerprints of the video. Sub-fingerprints are generated for time intervals of a video using sub-images of the video. Details of generating sub-fingerprints are described with respect to FIGS. 2 through 4. The video hosting system 102 generates one or more composite fingerprints of the video. Composite fingerprints are generated for time intervals of a video using fingerprints and sub-fingerprints generated for the time intervals of the video. Details of generating composite fingerprints are described with respect to FIG. 2. The video hosting system 102 matches a composite fingerprint against reference fingerprints. The reference fingerprints may be derived from videos corresponding to video files stored on the video hosting system 102 or elsewhere. If the composite fingerprint is determined to match a reference fingerprint, the video hosting system 102 determines that the received video includes video content of another video.

Additional Considerations

Some portions of the above description present the feature of the present invention in terms of algorithms and symbolic representations of operations on information. These algorithmic descriptions and representations are the means used by those skilled in the arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method of fingerprinting a video including video frames, comprising:
   receiving the video;
   generating a plurality of sub-images by steps comprising:
      for a first video frame of each of at least some of the video frames:
         generating a binary image for the first video frame, wherein each video pixel of the first video frame is identified in the binary image by a first value or a second value, the first value indicating a motion pixel and the second value indicating a still pixel, the first video frame comprising video pixels including the video pixel;
         identifying a first region of the binary image that comprises more of the first value than the second value, the first region being indicative of a motion in the first video frame; and
         identifying a sub-image of the plurality of sub-images of the video frame that is co-extensive and co-located with the first region of the binary image, the sub-image comprising image content;
   generating a plurality of sub-fingerprints for the video using the plurality of sub-images; and
   matching the video to a reference video using the plurality of sub-fingerprints.

2. The method of claim 1, wherein the video pixel of the first video frame is identified in the binary image by the first value in a case where the video pixel has a third pixel value in the first video frame and has a fourth pixel value in a second video frame, the first video frame and the second video frame being consecutive in the video, and a difference between the third pixel value and the fourth pixel value is greater than a threshold value.

3. The method of claim 1, wherein the video pixel of the first video frame is identified in the binary image by the second value in a case where the pixel has a third pixel value in the first video frame and has a fourth pixel value in a second video frame, the first video frame and the second video frame being consecutive in the video, and a difference between the third pixel value and the fourth pixel value is less than a threshold value.

4. The method of claim 1, wherein the first region is identified in a case where a ratio of a first number of region pixels of the first region having the first value to a second number of region pixels of the firs region having the second value exceeding a threshold ratio.

5. The method of claim 1, wherein the first region is identified on a condition that a size of the first region exceeds a threshold size.

6. The method of claim 1, further comprising:
   assigning a sub-image ID to the identified sub-image of the plurality of sub-images of the video frame;
   identifying a second region in a second frame that is consecutive to the first video frame, the second region corresponding to a second sub-image of a plurality of sub-images of the second frame;
   comparing a first location and a first size of the first region to a second location and a second size of the second region;
   responsive to determining that the first location of the first region is a same as the second location of the second region and that the first size of the first region is the same as the second size of the second region, assigning the sub-image ID to the second sub-image; and
   generating a sub-fingerprint of the plurality of sub-fingerprints based on the sub-image ID.

7. The method of claim 1, wherein the plurality of sub-images constitute a series of sub-images, further comprising:
   identifying a set of temporal locations of discontinuities in the image content of the series of sub-images;
   grouping the series of sub-images into one or more uninterrupted sequences of sub-images based on the set of temporal locations of discontinuities, wherein each of the one or more uninterrupted sequences of sub-images has continuity in the image content; and generating respective group fingerprints for at least some of the one or more uninterrupted sequences of sub-images,
wherein the matching the video to the reference video further uses the respective group fingerprints.

8. A system for fingerprinting a video including video frames, the system comprising:
a memory; and
a processor, the processor is configured to execute instructions stored in the memory to:
receive the video;
generate a plurality of sub-images by instructions to:
for a first video frame of each of at least some of the video frames:
generate a binary image for the first video frame, wherein each video pixel of the first video frame is identified in the binary image by a first value or a second value, the first value indicating a motion pixel and the second value indicating a still pixel, the first video frame comprising video pixels including the video pixel;
identify a first region of the binary image that comprises more of the first value than the second value, the first region being indicative of a motion in the first video frame; and
identify a sub-image of the plurality of sub-images of the video frame that is co-extensive and co-located with the first region of the binary image, the sub-image comprising image content;
generate a plurality of sub-fingerprints for the video using the plurality of sub-images; and
match the video to a reference video using the plurality of sub-fingerprints.

9. The system of claim 8, wherein the video pixel of the first video frame is identified in the binary image by the first value in a case where the pixel has a third pixel value in the first video frame and has a fourth pixel value in a second video frame, the first video frame and the second video frame being consecutive in the video, and a difference between the third pixel value and the fourth pixel value is greater than a threshold value.

10. The system of claim 8, wherein the video pixel of the first video frame is identified in the binary image by the second value in a case where the pixel has a third pixel value in the first video frame and has a fourth pixel value in a second video frame, the first video frame and the second video frame being consecutive in the video, and a difference between the third pixel value and the fourth pixel value is less than a threshold value.

11. The system of claim 8, wherein the first region is identified in a case where a ratio of a first number of region pixels of the first region having the first value to a second number of region pixels of the firs region having the second value exceeding a threshold ratio.

12. The system of claim 8, wherein the first region is identified on a condition that a size of the first region exceeds a threshold size.

13. The system of claim 8, wherein the instructions further comprise instructions to:
assign a sub-image ID to the identified sub-image of the plurality of sub-images of the video frame;
identify a second region in a second frame that is consecutive to the first video frame, the second region corresponding to a second sub-image of a plurality of sub-images of the second frame;
compare a first location and a first size of the first region to a second location and a second size of the second region; and
responsive to determining that the first location of the first region is a same as the second location of the second region and that the first size of the first region is the same as the second size of the second region, assign the sub-image ID to the second sub-image; and
generate a sub-fingerprint of the plurality of sub-fingerprints based on the sub-image ID.

14. The system of claim 8, wherein the plurality of sub-images constitute a series of sub-images, the instructions further comprise instructions to:
identify a set of temporal locations of discontinuities in the image content of the series of sub-images;
group the series of sub-images into one or more uninterrupted sequences of sub-images based on the set of temporal locations of discontinuities, wherein each of the one or more uninterrupted sequences of sub-images has continuity in the image content; and
generate respective group fingerprints for at least some of the one or more uninterrupted sequences of sub-images,
wherein the matching the video to the reference video further uses the respective group fingerprints.

15. A non-transitory computer-readable storage medium, comprising executable instructions that, when executed by a processor, facilitate performance of operations of fingerprinting a video including video frames, the operations comprising:
receiving the video;
generating a plurality of sub-images by steps comprising:
for a first video frame of each of at least some of the video frames:
generating a binary image for the first video frame, wherein each video pixel of the first video frame is identified in the binary image by a first value or a second value, the first value indicating a motion pixel and the second value indicating a still pixel, the first video frame comprising video pixels including the video pixel;
identifying a first region of the binary image that comprises more of the first value than the second value, the first region being indicative of a motion in the first video frame; and
identifying a sub-image of the plurality of sub-images of the video frame that is co-extensive and co-located with the first region of the binary image, the sub-image comprising image content;
generating a plurality of sub-fingerprints for the video using the plurality of sub-images; and
matching the video to a reference video using the plurality of sub-fingerprints.

16. The non-transitory computer-readable storage medium of claim 15, wherein the video pixel of the first video frame is identified in the binary image by the first value in a case where the pixel has a third pixel value in the first video frame and has a fourth pixel value in a second video frame, the first video frame and the second video frame being consecutive in the video, and a difference between the third pixel value and the fourth pixel value is greater than a threshold value.

17. The non-transitory computer-readable storage medium of claim 15, wherein the video pixel of the first video frame is identified in the binary image by the second value in a case where the pixel has a third pixel value in the first video frame and has a fourth pixel value in a second video frame, the first video frame and the second video frame being consecutive in the video, and a difference between the third pixel value and the fourth pixel value is less than a threshold value.

18. The non-transitory computer-readable storage medium of claim 15, wherein the first region is identified in a case where a ratio of a first number of region pixels of the first region having the first value to a second number of pixels of the first region having the second value exceeding a threshold ratio.

19. The non-transitory computer-readable storage medium of claim 15, wherein the first region is identified on a condition that a size of the first region exceeds a threshold size.

20. The non-transitory computer-readable storage medium of claim 15, further comprising:
  assigning a sub-image ID to the identified sub-image of the plurality of sub-images of the video frame;
  identifying a second region in a second frame that is consecutive to the first video frame, the second region corresponding to a second sub-image of a plurality of sub-images of the second frame;
  comparing a first location and a first size of the first region to a second location and a second size of the second region;
  responsive to determining that the first location of the first region is a same as the second location of the second region and that the first size of the first region is the same as the second size of the second region, assigning the sub-image ID to the second sub-image; and
  generating a sub-fingerprint of the plurality of sub-fingerprints based on the sub-image ID.

* * * * *